United States Patent [19]

Taguchi et al.

[11] Patent Number: 4,633,012
[45] Date of Patent: Dec. 30, 1986

[54] LIQUID CRYSTAL COMPOUND

[75] Inventors: Masaaki Taguchi; Takamasa Harada, both of Tokyo; Hitoshi Suenaga, Hyogo, all of Japan

[73] Assignees: Seiko Instruments & Electronics Ltd., Tokyo; Teikoku Chemical Industry Co., Ltd., Osaka, both of Japan

[21] Appl. No.: 743,094

[22] Filed: Jun. 10, 1985

[30] Foreign Application Priority Data

Jul. 3, 1984 [JP] Japan .................. 59-137492

[51] Int. Cl.$^4$ .......................... C09K 3/34; G02F 1/13
[52] U.S. Cl. .................. 560/138; 252/299.68; 350/350 S
[58] Field of Search .......... 252/299.6, 299.01, 299.68; 560/138; 350/350 S

[56] References Cited

U.S. PATENT DOCUMENTS

| | | | |
|---|---|---|---|
| 3,540,796 | 11/1970 | Goldmacher et al. | 252/299.68 |
| 3,675,987 | 7/1972 | Rafuse | 252/299.68 |
| 3,738,942 | 6/1973 | Matsumoto et al. | 252/299.68 |
| 3,769,313 | 10/1973 | Dietrich et al. | 252/299.68 |
| 3,769,314 | 10/1973 | Steiger et al. | 252/299.68 |
| 3,784,513 | 1/1974 | Steiger et al. | 560/138 |
| 3,799,971 | 3/1974 | Steiger et al. | 560/138 |
| 3,853,785 | 12/1974 | Labes | 252/299.68 |
| 3,925,236 | 12/1975 | Goldmacher et al. | 560/138 |
| 3,960,748 | 6/1976 | Klanderman et al. | 252/299.68 |
| 3,996,260 | 12/1976 | Oh et al. | 252/299.68 |
| 4,548,476 | 10/1985 | Kaneko | 350/350 S |

FOREIGN PATENT DOCUMENTS 59-214824  12/1984  Japan .................. 350/350 S

OTHER PUBLICATIONS

Demus, Flussige Kristalle in Tabellen, 1974, pp. 93-113.
Hallsby et al., MCLC, vol. 82, 1982, pp. 61-68.
Loseva et al., CA 93:86116, 1980.
Aliev et al. CA 96:133710, 1982.

*Primary Examiner*—Teddy S. Gron
*Assistant Examiner*—Jack Thomas
*Attorney, Agent, or Firm*—Robert E. Burns; Emmanuel J. Lobato; Bruce L. Adams

[57] ABSTRACT

A liquid crystal compound represented by the following general formula:

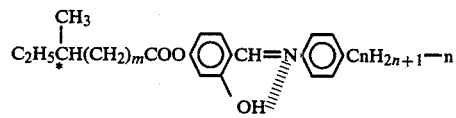

wherein m is a number from 0 to 10, n is a number from 5 to 14, and C having an asterisk indicates an asymmetric carbon atom.

2 Claims, 4 Drawing Figures

LIQUID CRYSTAL COMPOUND

BACKGROUND OF THE INVENTION

The present invention relates to a novel liquid crystal valuable for an electro-optical element utilizing a response of a ferroelectric smectic liquid crystal to an electric field.

Liquid crystals have been utilized as various electro-optical elements and they are used for displaying in watches or electronic table calculators. Liquid crystal elements practically used at the present time are mainly based on the dielectric arrangement effect of a nematic liquid crystal or cholesteric liquid crystal. However, in case of expected application to a display element having many image elements, the response characteristics are insufficient and, since no sufficient driving margin can be maintained, the contrast and visual angle characteristics are insufficient. Accordingly, research and development have been vigorously made on a MOS panel or TFT panel in which a switching element is formed for each image element.

Under these circumstances, Clark et al. developed a liquid crystal element based on a new display principle using the smectic phase, in which the above-mentioned defects of the liquid crystal are eliminated. This liquid crystal element will now be described in brief.

FIG. 1 is a diagram illustrating the smectic C* or H phase. The liquid crystal comprises respective molecule layers 1, and the average direction of the long axis of the molecule in these layers is inclined by an angle $\psi_0$ relative to the direction vertical to the layers. In the thesis entitled "Ferroelectric Liquid Crystals" in Le Journal de Physique, Vol. 36 (March 1975, pages L-69 to L-71), Meyer et al. teach that a smectic C* or H liquid crystal composed of optically active molecules generally has an electric dipole density $\vec{P}$ and is ferroelectric. This dipole density $\vec{P}$ is vertical to the inclination direction $\hat{n}$ of the molecules and is parallel to the layer face of the smectic phase. Although what is taught by them is applicable also to the smectic H phase, the viscousness to rotation around the axis vertical to the layer is large in the phase H. The presence of an electric dipole in this chiral smectic gives a much stronger coupling force to the electric field than in the dielectric anisotropy. Furthermore, this coupling force has a polar characteristic in the sense that the preferred direction of $\vec{P}$ is a direction parallel to $\vec{E}$. Accordingly, if the direction of the applied electric field is inverted, the direction of $\vec{P}$ is inverted. Namely, by inversion of the electric field (the angle $2\psi_0$ of this cone will be referred to as "cone angle" hereinafter), as shown in FIG. 2, the direction of $\vec{P}$ can be controlled by the movement of the molecules along the cone. Accordingly, the liquid crystal can be utilized as an electro-optical element by detecting changes of the molecules in the direction of the average long axis by means of two polarizing plates.

In an electro-optical element utilizing the response of this smectic C* or H phase to an electric field, the coupling force between the spontaneous polarization and the electric field is larger on the order of $10^3$ to $10^4$ than the coupling force by the dielectric anisotropy. Accordingly, the response speed of this element is higher than that of a TN type liquid crystal element and, if appropriate orientation control is selected, a memory characteristic can be given to this element. Therefore, it is expected that this electro-optical element will be applied to a high-speed optical shutter or a display device having a large display information quantity.

Various chiral smectic liquid crystals having this ferroelectric characteristic have heretofore been synthesized and investigated. The ferroelectric liquid crystal first synthesized is p-decyloxybenzilidene-p'-amino-2-methylbutyl cynnamate generally called "DOBAMBC". Liquid crystals of this series represented by the following structural formula have been synthesized and investigated as ferroelectric liquid crystals:

wherein X stands for H, Cl or CN, Y stands for Cl or $C_2H_5$, and the asterisk indicates an asymmetric carbon atom.

Since a liquid crystal of this series shows the chiral smectic phase at a relatively high temperature exceeding room temperature, this liquid crystal is defective in that the liquid crystal cannot be used at room temperature. Moreover, since this liquid crystal is of the Schiff base type, it is readily decomposed with water and the stability is poor.

As an improved liquid crystal developed from the above-mentioned series, B. I. Ostrovskii et al. [Ferroelectrics, 24, 309 (1980)] and A. Hallsby et al. [Mol. Cryst. Liq. Cryst., Letter 82, 61 (1982)] proposed a chiral smectic liquid crystal compound of the Schiff base type having a hydroxyl group introduced into one benzene ring and a hydrogen bond in the molecule, as represented by the following general formula:

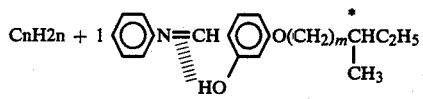

and this compound has attracted attention in the art as a compound showing the smectic C* phase in a broad temperature range including room temperature. Since this compound contains a hydrogen bond in the molecule, it is hardly decomposed with water and is excellent in the stability over ordinary liquid crystals of the Schiff base type. However, this compound is still insufficient because non-crystallization even at temperatures lower than 0° C. is practically required.

An azoxy type liquid crystal material was reported by P. Keller et al. [Ann. Phys., 139 (1978)]. However, since the applicable temperature range is insufficient and this liquid crystal is a densely yellow compound, this liquid crystal material can hardly be put into practical use.

An ester type liquid crystal which is meritorious in the stability among TN type liquid crystal materials is noticeable. In the known literature reference, B. I. Ostrovskii et al. reported that a compound represented by the following formula:

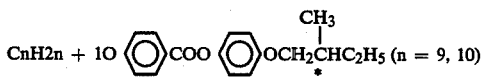

is a material showing a chiral smectic liquid crystal phase at temperatures relatively close to room temperature. Moreover, G. W. Gray et al. [Mol. Cryst. Liq.

Cryst., 37, 189 (1976) and 48, 37 (1978)] reported a biphenyl ester type material showing a chiral smectic liquid crystal phase at relatively high temperatures.

SUMMARY OF THE INVENTION

As is apparent from the foregoing description, a liquid crystal material that can be put into practical use and shows a chiral smectic phase in a broad temperature range including room temperature has not yet been developed, and at the present, the range of the temperatures showing the Sc* phase should be broadened by blending various liquid crystals. We measured the response characteristics of known liquid crystal compounds showing the Sc* phase and found that, among materials showing the Sc* phase at temperatures close to room temperature, a liquid crystal compound of the above-mentioned formula (1) in which m is 1 and n is 8, that is, so-called MBRA8, has a highest response speed of about 500 μsec. However, in order to effectively utilize high-response characteristics in ferro-electric liquid crystal display devices, it is necessary to develop a liquid crystal material having a higher response speed.

It is therefore an object of the present invention to provide a novel liquid crystal compound showing an Sc* phase at temperatures close to room temperature and high-speed response characteristics.

DETAILED DESCRIPTION OF THE INVENTION

Figure 1:
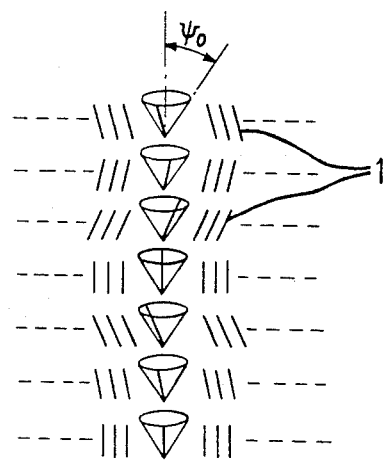
FIG. 1 is a model illustrating the smectic C* phase or H phase.
Figure 2:
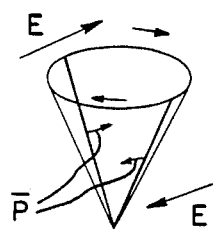
FIG. 2 is a model showing the movement of the liquid crystal molecules of the chiral smectic phase along the cone by an electric field.

With a view to solving the above-mentioned problem, we synthesized a novel optically active liquid crystal compound represented by the following general formula:

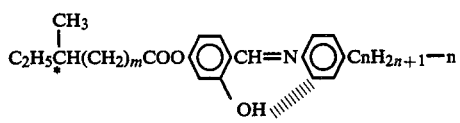

wherein m is 0 to 10, n is 5 to 14, and the asterisk indicates an asymmetric carbon atom.

Most of compounds represented by the above formula were found to show the Sc* phase at temperatures close to room temperature and have a high response speed. From the results of experiments made by us, it was confirmed that the compounds of the present invention had a higher response speed than MBRA8 having a highest response speed among known liquid crystal compounds showing the Sc* phase at temperatures close to room temperature.

The response speed τ is represented by the following formula:

$$\tau \propto \eta/Ps \cdot E$$

wherein

η stands for the rotational viscosity,
Ps stands for the spontaneous polarization and
E stands for the intensity of an electric field.

The compound of the present invention has a high-speed response property because the value Ps is increased by substitution of —O— participating in the spontaneous polarization Ps with

in the side chain.

Since the liquid crystal compound of the present invention has a high-speed response property, the response characteristics can be enhanced if this liquid crystal compound is incorporated as a blending material into other chiral smectic liquid crystal compound.

An example of the process for the synthesis of the liquid crystal compound of the present invention is represented by the following chemical formula:

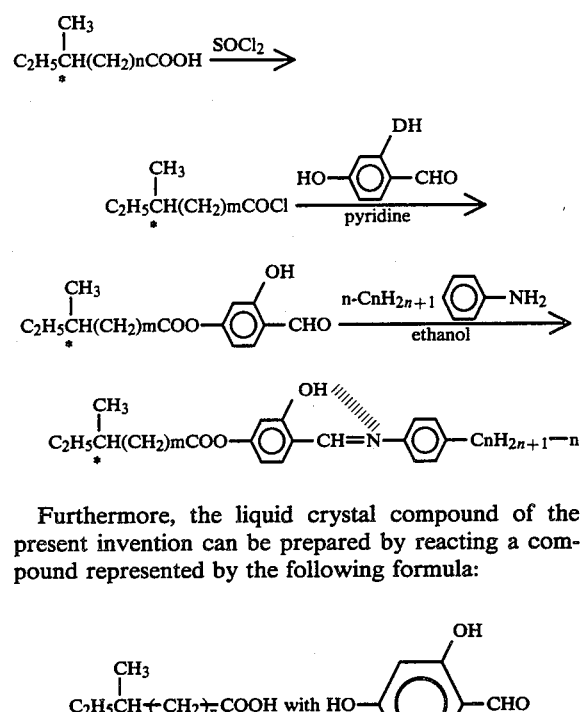

Furthermore, the liquid crystal compound of the present invention can be prepared by reacting a compound represented by the following formula:

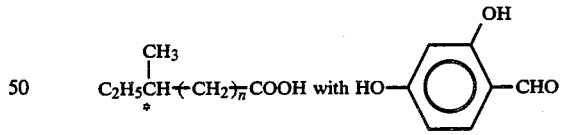

in the presence of a condensing agent (such as DCC) and reacting the obtained compound of the following formula:

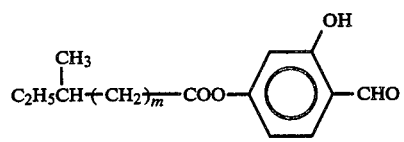

EXAMPLE 1

The process for the synthesis of optically active 4-(3-methylpentylcarboxy)-2-hydroxybenzylidene-4'-octylaniline is now described.

First Stage

Synthesis of optically active 3-methylpentylcarboxy-2-hydroxybenzaldehyde

To 5.7 g of optically active 3-methylvaleric acid synthesized from commercially available active amyl alcohol was added 30 ml of thionyl chloride, and reaction was carried out under heat and reflux for 3 hours. Excessive thionyl chloride was distilled to obtain oily 3-methylvaleroyl chloride.

b.p.: 141°~144° C.
$V_{max}^{film}$: 1810 cm$^{-1}$.

The obtained acid chloride was dissolved in 6 ml of dry ether and the solution was added dropwise under ice cooling to a mixture comprising 6.77 g of 2,4-dihydroxybenzaldehyde, 7.76 g of dry pyridine and 14 ml of dry ether. After the dropwise addition, the temperature was elevated to room temperature and reaction was carried out under reflux for 5 hours. The reaction mixture was poured into ice water and extracted with ether. The organic layer was washed with 2N HCl, 5% NaOH, water and a saturated aqueous solution of sodium chloride and dried. Ether was removed by distillation and the obtained oily product was repeatedly refined to obtain 5.4 g of optically active 3-methylpentylcarboxy-2-hydroxybenzaldehyde.

$V_{max(cm^{-1})}^{film}$: 3080, 2740, 1765, 1695.

$\delta_{TMS}(ppm)^{CDCl_3}$: 11.37, S, 1H, —OH (D.O. exchangeable), 9.96, S, 1H, —CHO, 6.80~8.03, m, 3H, Aromatic H, 2.33~2.52, m,

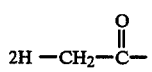

2H —CH$_2$—C—

Second Stage

Synthesis of optically active 4-(3-methylpentylcarboxy)-2-hydroxybenzylidene-4'-octylaniline A 50-ml 3-neck flask was charged with 2.84 g of 4-(3-methylpentylcarboxy)-2-hydroxybenzaldehyde, 2.46 g of 4-n-octylaniline and 25 ml of dry ethanol, and reaction was carried out under heat and reflux for 3 hours. After completion of the reaction, the reaction mixture was cooled, and the precipitated crystal was recovered by filtration. The obtained crude crystal was repeatedly refined to obtain 3.46 g of optically active 4-(3-methylpentylcarboxy)-2-hydroxybenzylidene-4'-octylaniline.

$V_{max(cm^{-1})}^{smjol}$ 1765, 1612, 1605.

$\delta_{TMS(ppm)}^{CDCl_3}$: 13.77, broads, 1H —OH, (D$_2$O exchangeable), 8.6, S, 1H —CH=N—, 6.67~7.93, m, 7H, Aromatic H, 2.32~2.82, m, 4H,

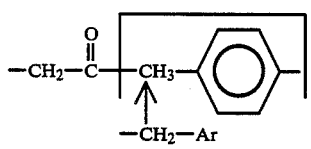

This liquid crystal compound (referred to as "LC-1") was found to show the following phase transition:

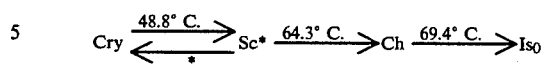

The asterisk indicates super-cooling.

This liquid crystal compound LC-1 was inserted between substrates monoaxially oriented by PVA rubbing, and the thickness of the liquid crystal layer was adjusted to 2.5 μm. The characteristics were determined under a crossing nicol by applying a voltage of ±10 V. The measurement temperature was 27° C.

Response speed: 320 μsec
Contrast (Ton/Toff): 7.8
Cone angle: 41.5°

Although the foregoing data are those determined in a super-cooled state, it is seen that LC-1 is characterized by a very high response property.

Figure 3:
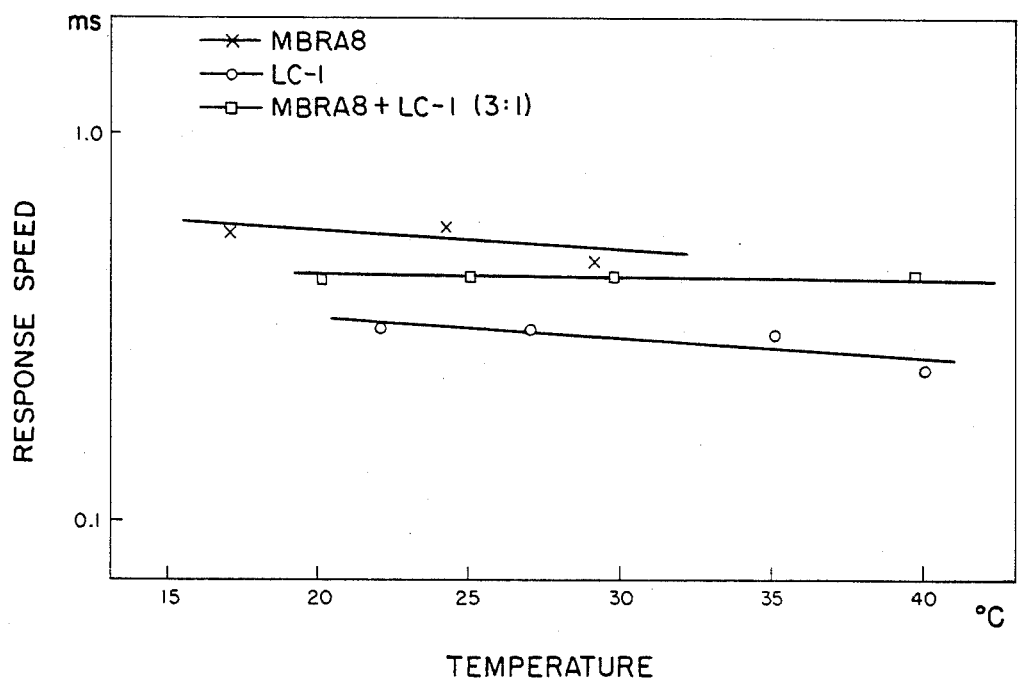
FIG. 3 is a graph showing the temperature dependency of the response speed.
Figure 4:
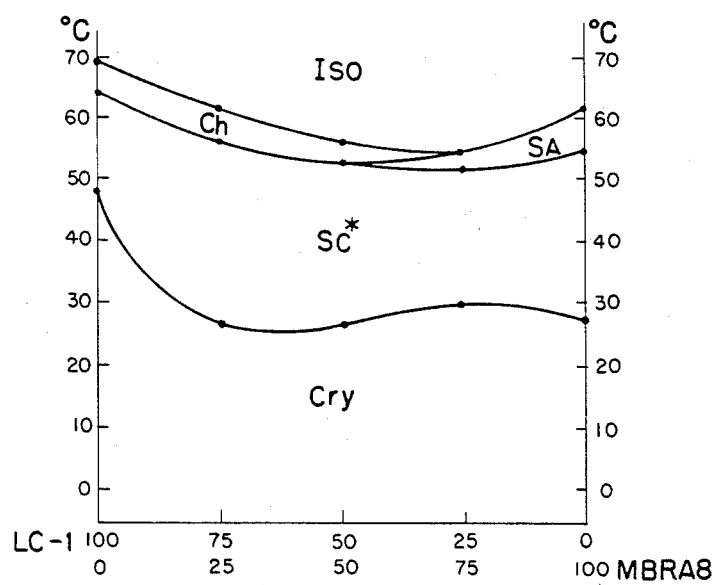
FIG. 4 is a phase diagram of a blend of two liquid crystals.

The temperature dependency of the response speed of LC-1 is shown in the graph of FIG. 3. For comparison's sake, data collected under the same condition with respect to MBRA8 and a 3/1 blend of MBRA8/LC-1 are shown in FIG. 3. A phase diagram of a blend of LC-1 and MBRA8 is shown in FIG. 4.

From these data, it will readily be understood that the liquid crystal compound LC-1 has a higher response speed than MBRA8, and the response characteristics of MBRA8 can be improved if LC-1 is incorporated into MBRA8. In the blend of LC-1 and MBRA8, the temperature range showing the Sc* phase cannot be greatly broadened, but it has been confirmed that LC-1 is a material effective in improving the response characteristics.

EXAMPLES 2-8

Following liquid crystal compounds were synthesized by the manner similar to that of Example 1. The phase transition temperature and the response speed of these compounds were measured, so that the following data were obtained. The response speed was measured by the manner similar to that of Example 1.

| Example No. | m | n | Phase Transition Temperature (°C.) | Response Speed |
|---|---|---|---|---|
| 2 | 0 | 6 | Cry $\xrightarrow{39.1}$ Iso, $S_A$ 36.6 | — |
| 3 | 0 | 8 | Cry $\underset{*}{\overset{34.0}{\rightleftarrows}}$ Sc* $\xrightarrow{43.0}$ Iso | 170, 28° C. |
| 4 | 0 | 9 | Cry $\underset{*}{\overset{37.4}{\rightleftarrows}}$ Sc* $\xrightarrow{50.5}$ $S_A$ $\xrightarrow{52.5}$ Iso | 190, 32° C. |
| 5 | 0 | 10 | Cry $\underset{*}{\overset{38.6}{\rightleftarrows}}$ Sc* $\xrightarrow{40.9}$ $S_A$ $\xrightarrow{49.5}$ Iso | 160, 34° C. |
| 6 | 0 | 11 | Cry $\underset{*}{\overset{48.4}{\rightleftarrows}}$ Sc* $\xrightarrow{57.2}$ Iso | 200, 55° C. |

| Example No. | m | n | Phase Transition Temperature (°C.) | Response Speed |
|---|---|---|---|---|
| 7 | 1 | 11 | Cry $\xrightarrow{49.6}$ $S_C^*$ $\xrightarrow{71.6}$ $S_A$ $\xrightarrow{73.3}$ Iso, *22, 13 $S_X$ | 400 55° C. |

As is apparent from the foregoing description, the novel liquid crystal compound of the present invention shows the Sc* phase and has a very high response property. Accordingly, the liquid crystal compound of the present invention is very effective as a liquid crystal material for a ferroelectric liquid crystal display element of a multi-divided moving image display panel or a high-speed optical shutter where high-speed response characteristics are required. Therefore, the present invention makes great contributions to practical utilization of ferroelectric smectic liquid crystal elements.

What is claimed is:

1. A liquid crystal compound represented by the following general formula:

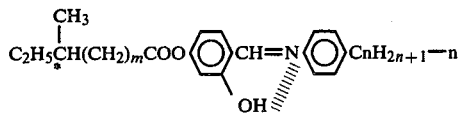

wherein m is a number from 0 to 10, n is a number from 5 to 14, and C having an asterisk indicates an asymmetric carbon atom.

2. A liquid crystal compound as claimed in claim 1, wherein m is 0 or 1 and n is a number from 8 to 11.

* * * * *